United States Patent [19]

Ostarek et al.

[11] Patent Number: 5,981,644
[45] Date of Patent: Nov. 9, 1999

[54] METHOD OF PRODUCING ABS MOULDING COMPOSITIONS

[75] Inventors: Ralph Ostarek, Düsseldorf; Herbert Eichenauer, Dormagen, both of Germany; Karl-Erwin Piejko, Longmeadow, Mass.; Frank Wingler, Leverkusen; Claus Wulff, Krefeld, both of Germany

[73] Assignee: Bayer Aktiengesellschaft, Germany

[21] Appl. No.: 08/814,988

[22] Filed: Mar. 14, 1997

[30] Foreign Application Priority Data

Mar. 20, 1996 [DE] Germany .................. 196 10 931

[51] Int. Cl.⁶ ...................................... C08J 3/11
[52] U.S. Cl. .................. 524/502; 524/500; 524/765; 524/770; 525/146; 525/216; 525/218; 525/316
[58] Field of Search .................. 524/765, 770, 524/500, 502; 525/53, 316, 149, 152, 216, 222, 238, 241, 942

[56] References Cited

U.S. PATENT DOCUMENTS

| | | | |
|---|---|---|---|
| 4,587,294 | 5/1986 | Matsubara et al. | 525/53 |
| 5,223,577 | 6/1993 | Baumgartner et al. | 525/149 |
| 5,286,792 | 2/1994 | Wu et al. | 525/84 |
| 5,387,650 | 2/1995 | Baumgartner et al. | 525/316 |

FOREIGN PATENT DOCUMENTS

| | | |
|---|---|---|
| 0 015 751 | 9/1980 | European Pat. Off. . |
| 0 015 752 | 9/1980 | European Pat. Off. . |
| 0 376 232 | 7/1990 | European Pat. Off. . |
| 0417310 | 3/1991 | European Pat. Off. . |
| 0632072 | 1/1995 | European Pat. Off. . |
| 40 17 680A1 | 12/1991 | Germany . |
| 4429320 | 2/1996 | Germany . |

OTHER PUBLICATIONS

Houben Weyl, Methoden der organischen Chemie, vol. E 20/Part 1, pp. 182–217, Georg Thieme Verlag Stuttgart.

*Primary Examiner*—Robert Dawson
*Assistant Examiner*—D. Aylward
*Attorney, Agent, or Firm*—Connolly Bove Lodge & Hutz

[57] ABSTRACT

A method of producing ABS moulding compositions wherein a solution of polymers in group (A) solvents is gradually supplied to a polymerizing mixture of previously-formed soluble rubber, aromatic mono-alkenyl compounds, ethylenically unsaturated nitrites, optional other copolymerizable compounds and optionally a group (B) solvent or a mixture of group (A) and group (B) solvents, the gradual addition of the polymer solution to the polymerizing mixture being started before the beginning of phase inversion and at a monomer conversion rate of 5 to 15% and a viscosity of the polymerizing mixture of less than 20 Pa.sec with simultaneous continuation of polymerization, the group (A) solvent is an aliphatic ($C_1$–$C_8$) or cycloaliphatic alcohol, ketone, ether, ester and/or nitrile, and the group (B) solvent is an aliphatic ($C_4$–$C_{10}$), cycloaliphatic and/or aromatic hydrocarbon.

8 Claims, No Drawings

METHOD OF PRODUCING ABS MOULDING COMPOSITIONS

The invention relates to a method of producing ABS moulding compositions by metered addition of a solution of polymers dissolved in polar solvents to a polymerizing mixture of previously-formed soluble rubber, aromatic monoalkenyl compounds, ethylenically unsaturated nitrites and optionally other copolymerizable compounds such as esters and amides of acrylic and methacrylic acids, maleic acid anhydride and derivatives thereof, methylene succinic acid anhydride and derivatives thereof, and optionally another solvent.

The method according to the invention requires only simple polymerization technique and can operate with a high rubber content, owing to greatly reduced visco-elasticity during the phase inversion. The products according to the invention, depending on the added polymer, have high impact strength, great hardness, a light natural colour, a dull surface, translucency, high dimensional stability when heated and excellent processing properties.

The object of the invention is a reliable method of producing ABS moulding compositions without special high-viscosity technique even at a high content of rubber, owing to reduced viscosity of the polymerization solution, and yielding products which have good mechanical properties owing to adequate dispersion of the rubber particles.

The invention relates to a method of producing ABS moulding compositions wherein a solution of polymers in group (A) solvents is gradually supplied to a polymerizing mixture of previously-formed soluble rubber, aromatic mono-alkenyl compounds, ethylenically unsaturated nitrites, optionally other copolymerizable compounds and optionally a group (B) solvent or a mixture of group (A) and group (B) solvents, the gradual addition of the polymer solution to the polymerizing mixture being started before the beginning of phase inversion and at a monomer conversion rate of 5 to 15% and a viscosity of the polymerizing mixture of less than 20 Pa.sec with simultaneous continuation of polymerization, the group (A) solvent is an aliphatic ($C_1$–$C_8$) or cycloaliphatic alcohol, ketone, ether, ester and/or nitrile, and the group (B) solvent is an aliphatic ($C_4$–$C_{10}$), cycloaliphatic and/or aromatic hydrocarbon.

In one embodiment of the method according to the invention, (1) 90 to 20 parts by weight of aromatic monoalkenyl compound, (2) 10 to 50 parts by weight of ethylenically unsaturated nitrile and (3) optionally 0 to 30 parts by weight of other compounds copolymerizable with (1) and (2), such as esters or amides of acrylic or methacrylic acid, maleic acid anhydride or derivatives thereof, methylene succinic acid anhydride or derivatives thereof in the presence of (4) 6 to 50 parts by weight of a soluble gel-free rubber are polymerized, initiated by radicals and with agitation, in the presence of (5) 0 to 200 parts by weight of a group (B) solvent or a mixture of group (A) and group (B) solvents (6) up to a monomer conversion rate, relative to the sum of monomers (1 to 3) of 5 to 15 wt. %.

Within a time of preferably 0.5 to 4.5 hours, the following is continuously added to the said polymerizing mixture:

(7) 20 to 400 parts by weight of a 5 to 50 wt. % solution of a polymer in a solvent or solvent mixture from group (A)

and (8) the radically initiated polymerization is continued, with thorough mixing, up to a monomer conversion rate of 30 to 99 wt. %, relative to the sum of monomers (1–3).

Rubber-modified moulding compositions comprising aromatic vinyl monomers and ethylenically unsaturated nitrile monomers are known as ABS moulding compositions.

They can be produced by aqueous emulsion polymerization, suspension or mass/solution polymerization. Mass and solution polymerization are described e.g. in Houben Weyl, Methoden der organischen Chemie, Volume E 20/Part 1, pages 182–217, Georg Thieme Verlag Stuttgart. The disadvantages of the known methods are high temperatures, polymerization under pressure, high viscosities, and the safety aspects associated with high pressures and temperatures.

In mass polymerization, e.g. according to U.S. Pat. No. 4,587,294, U.S. Pat. No. 5,286,792 or EP-A-376 232, it is conventional to add small quantities of solvents in order to prevent runaway of polymerization by cooling by boiling. Larger amounts of solvents are undesirable (compare U.S. Pat. No. 4,587,294) since they affect the economics of the process.

The properties of ABS substances produced by mass/solution polymerization are considerably affected by the shape of the rubber particles, which depends inter alia on the conditions during phase inversion.

The solution of rubber in the monomers and optional solvent is usually polymerized by heating or with radical initiators. Immediately after polymerization begins, a phase of polymer dispersed in the rubber solution forms in the monomers. An increase in conversion rate is accompanied by an increase in the proportion of dispersed phase, together with a constant increase in the viscosity of the polymerization solution. If the conversion rate increases to such an extent that the proportion of dispersed phase exceeds the proportion of continuous phase, a phase inversion occurs when the rubber solution previously present as the continuous phase becomes the dispersed phase and rubber particles form as a result. Phase inversion is shown by a drop in the viscosity of the polymerization solution. The phase inversion therefore begins at a maximum on the viscosity curve.

The shape of the rubber particles depends inter alia on the polymerization conditions, the shearing conditions, the viscosity and the rubber content. Since the size, shape and filling coefficient of the rubber particles distributed in the resin matrix influence properties such as toughness, stiffness, rubber efficiency and surface quality of the polymers, there are descriptions of a number of steps for controlled adjustment of the rubber particle size and the filling coefficient.

For example EP-A-15 752 discloses that the rubber particles increase in size if some of the polymerization solution is returned to the first reactor after the conversion rate reaches 20 to 38%, in order to increase the viscosity of the solution at the time of phase inversion. In EP-A-15 751 the same object is achieved in that the starting solution of rubber contains polystyrene previously formed in the monomers, or styrene-acrylonitrile copolymer. In DE-A-40 17 680 the particle size is influenced in that a polymer compatible with the styrene in the rubber but not compatible with styrene-acrylonitrile copolymer is provided in the starting solution together with the rubber (styrene/butadiene block copolymer) and the monomers.

If an attempt is made to increase the rubber content of the product (e.g. in order to compound ABS moulding compositions with other polymers to obtain rubber-modified polymer blends) the viscosity of the reaction mixture before phase inversion increases to an extent requiring special reaction and agitation techniques. During phase inversion there is a sharp increase in the elastic component of viscosity, which makes up to 50% of the total viscosity. The high visco-elasticity results in problems during agitation, a wide viscosity curve and consequent inadequate dispersion of the rubber particles and inadequate mechanical properties of the ABS moulding compositions.

It has been found that even at a high rubber content in the polymerization solution, phase inversion is rapid, resulting in a narrow viscosity curve, and visco-elasticity remains low during phase inversion if a solution of a suitable polymer in a group (A) solvent is added in metered manner to the polymerizing mixture of rubber, aromatic monoalkenyl compound and ethylenically unsaturated nitrile before phase inversion, at a conversion rate of 5 to 15% and a viscosity of the polymerization solution below 20 Pa.sec, preferably below 10 Pa.sec.

The rapid reduction in the viscosity of the polymerizing solution, without passing through viscoelastic states, by metered addition of the polymer solution according to the invention makes it easier to agitate the polymerizing mixture during phase inversion. The homogeneity of the polymerizing solution is therefore improved, even at a higher rubber content. Rapid agitation ensures uniform heat dissipation without local overheating and prevents coatings forming on the walls. The introduced increased shearing energy also results in smaller rubber particles with a narrower particle-size distribution.

The metered addition of the polymer solution according to the invention improves the reaction, even at a high rubber content, and results in high reproducibility of quality-determining parameters such as molecular weight, conversion rate and degree of grafting, and shape, size and filling coefficient of the rubber particles. Owing to the improvement in the reaction, the rubber content of ABS moulding compositions can be increased to such an extent, using a simple polymerization technique, that they can be subsequently compounded with other polymers to form rubber-modified polymer blends.

There are also advantages in the process steps after polymerization, owing to the reduction in viscosity and visco-elasticity due to metered addition of the polymer solution according to the invention, even at a high rubber content. For example, the requirements on pumps are appreciably lower, owing to the lower structural viscosity of the polymerizing solution. Devolatilization is also simplified, since the concentrated polymer melts also have lower visco-elasticity.

Metered addition of polymer solutions according to the invention is also a means of producing ABS moulding compositions with special mechanical properties. As examples 9 to 16 show, addition of solutions of copolymers containing N-phenyl maleic imide or α-methyl styrene results in ABS moulding compositions which have high heat distortion temperature (Vicat B 120: 108 to 114° C.). Addition of solutions of copolymers containing methyl methacrylate results in translucent ABS moulding compositions with excellent natural colour, so that they can be dyed with smaller admixtures of pigment.

Examples 11 and 15 show that there is also a surprising improvement in notch impact strength at low temperatures after adding poly(styrene-co-acrylonitrile-co-N-phenyl maleic imide) or poly(styrene-co-maleic acid anhydride).

To sum up, the ABS moulding compositions produced by the method according to the invention have properties equivalent or superior to ABS substances produced according to the prior art.

The polymers can be homopolymers or copolymers soluble in group (A) solvents, produced by polymerization of aromatic monoalkenyl compounds, ethylenically unsaturated nitriles, acrylic acids and esters thereof or unsaturated polycarboxylic acids and derivatives thereof.

The polymers may also be aromatic polycarbonates soluble in group (A) solvents, produced by polycondensation of dihydroxyphenyl propane and/or alkyl-substituted dihydroxyphenyl cycloalkanes.

Preference is given to homopolymers and copolymers produced by polymerization of styrene, α-methyl styrene, acrylonitrile, maleic acid anhydride, N-phenyl maleic imide, methacrylic acid esters or acrylic acid esters, or polymers produced by copolycondensation of dihydroxyphenyl propane and dihydroxyphenyl trimethyl cyclohexane.

Special preference is given to polymers such as poly (styrene-co-acrylonitrile) poly(styrene-co-acrylonitrile-co-N-phenyl maleic imide), poly(α-methyl styrene-co-acrylonitrile), poly(styrene-co-N-phenyl maleic imide), poly (styrene-co-maleic acid anhydride), polystyrene, poly (styrene-co-methacrylic acid methyl ester), poly(styrene-co-acrylonitrile-co-methacrylic acid methyl ester), poly((α-methyl styrene-co-acrylonitrile-co-methyacrylic acid methyl ester), poly(methacrylic acid methyl ester), poly (methacrylic acid methyl ester-co-acrylic acid butyl ester) and co- and homopolycarbonates, containing at least 10 wt. % of bisphenol 1,1-bis(4-hydroxyphenyl)-3,3,5-trimethyl cyclohexane.

Group (A) solvents are alcohols such as methanol, ethanol, propanol, isopropanol, butanol, isobutanol, tert.butanol, amyl alcohol, isoamyl alcohol, isooctanol, cyclohexanol; ketones such as acetone, methyl ethyl ketone, methyl isopropyl ketone, methyl isobutyl ketone, cyclopentanone, cyclohexanone; ethers such as tetrahydrafuran, dioxan, ethylene glycol dimethyl or diethyl or dipropyl or diisopropyl ether; esters such as ethyl acetate, propyl acetate, butyl acetate etc; nitriles such as acetonitrile, propionitrile or butyronitrile. Methyl ethyl ketone, aceteone and tetrahydrofuran are preferred.

Group (B) solvents are aliphatic hydrocarbons such as butane, pentane, hexane, heptane, octane or iso-derivatives thereof, cyclo-aliphatic hydrocarbons such as cyclopentane, cyclohexane, alkyl cyclopentane or alkyl cyclohexane, or aromatic hydrocarbons such as benzene, toluene, xylenes or ethyl benzene. Hexane, toluene and ethyl benzene are preferred.

Molecular weights are adjusted as in the prior art, using conventional chain transfer agents such as mercaptans and olefins, e.g. tert.dodecyl mercaptan, cyclohexene, terpinols u.v. in proportions of 0.05 to 1.0 wt. % relative to copolymerizing monomers (1–3).

The initiators for radical polymerization can be peroxides and/or azo compounds which are active in grafting and decompose into radicals. Examples of such substances are azo diisobutyric acid dinitrile, azo isobutyric acid alkyl esters and tert.-butyl perpivalates or peroctoate or perbenzoate or pemeodecanoate. These initiators are used in proportions of 0.01 to 0.5 wt. %, relative to monomers (1–3).

Conventional additives such as dyes, anti-oxidizing agents, lubricants and stabilisers can be added in a manner known to the skilled man, during polymerization or afterwards and before processing.

The rubbers can be a graftable soluble rubber with a low gel content. These substances are preferably polybutadienes with a 1,2-vinyl content of 2 to 40%, preferred 8 to 25%, relative to the double bonds, molecular weights from 50,000 to 500,000, styrene copolymers in random or block form, or branched or star-shaped polymers such as used in the prior art for producing "solution" or "mass" ABS. Other suitable rubbers are based on ethylene-propylene copolymers or based on acrylic ester copolymers known in the art.

The aromatic monoalkenyl compounds (1) are styrene, α-methyl styrene, ring-substituted alkyl styrenes or ring-substituted chlorostyrenes.

Ethylenically unsaturated nitriles (2) are acrylonitrile and methacrylonitrile.

The copolymerizing compounds (3) are e.g. acrylic acid or methacrylic acid, esters thereof such as butyl acrylate, ethyl hexyl acrylate, methyl methacrylate, ethyl methacrylate, tert.-butylmethacrylate, or maleic acid anhydride or derivatives thereof such as maleic acid ester, fumaric acid ester, maleic acid imide or N-substituted maleic imides, preferably such as N-cyclohexyl or N-phenyl maleic imide, or derivatives of methylene succinic acid anhydride or amides of the said unsaturated carboxylic acids.

The method according to the invention can be discontinuous or continuous. In continuous polymerization, advantageously the rubber (4) is dissolved in the monomers (1–3) or optionally the solvent (5) and polymerized in a continuously loaded, thoroughly mixed and agitated tank reactor at a steady monomer conversion rate of 5 to 15% by weight relative to the sum of the polymerizing monomers (1–3). The polymerizing solution is continuously transferred to a second tank reactor where it is mixed with the solution of the suitable polymer (7) and the radically initiated polymerization is continued up to a monomer conversion rate, relative to the sum of monomers (1–3), of 30 to 99 wt. %, with thorough mixing in one or more other continuously operated agitating boilers in cascade or in a thorough-mixing plug flow reactor and/or a combination of both types of reactor.

Discontinuous polymerization according to the invention is brought about in at least one, preferably two or more filled or partly-filled and thoroughly-mixed agitation reactors. The rubber (1–5) dissolved in the monomers and optionally in the solvent is provided, then polymerized with radical initiation up to the stated monomer conversion rate of 5 to 15 wt. %, and the solution of the suitable polymer is added in metered manner to the polymerizing mixture and polymerized up to the stated final conversion rate of 30 to 99%.

All variants are characterised by separate addition, in time and/or space, of the solution of the suitable polymer (7) to the polymerizing mixture of rubber and monomers.

The two polymer solutions can be mixed in conventional homogenizing devices such as agitators, static mixers or homogenizing nozzles. Use of homogenizing nozzles is preferred.

The dispersed rubber particles produced during phase inversion can be further comminuted by mechanical means in order to obtain the appropriate particle-size distribution. This can be done in the reactors or in the reactor loop or between the reactors. The mechanical means can e.g. be agitators, rapidly-rotating toothed discs, rotor-stator dispersers or combinations of pressurising pumps and jet nozzles. It is preferable to use jet nozzles between the first and the second reactor.

Polymerization is preferably brought about at temperatures of 60 to 120° C., preferably at the boiling-point of the solvent/polymer mixture. Advantageously polymerization occurs at normal pressure, but polymerization at slight excess pressure up to 3 bar is an alternative.

The polymer mixtures produced by the method according to the invention can be isolated in a manner known per se by precipitation in solvents, stripping with water and/or steam or concentration by evaporation in expansion evaporators, continuous evaporators, helical-tube evaporators, thin-film evaporators, thin-layer evaporators, falling-film evaporators, agitated multiple-phase evaporators with kneading and stripping devices or screw evaporators, etc. Residual monomers and solvents can be returned to the process. Blowing agents and entrainers such as water-vapour or nitrogen can also be used. Additives, stabilisers, anti-ageing materials, fillers and lubricants can be added during processing of the polymer. Alternatively, as in the prior art, they can be added to the starting solutions at the beginning of polymerization.

The polymer solutions produced by the method according to the invention can be mixed with solutions of other polymers and processed subsequently, or can be processed and then mixed in conventional manner with other polymers in the melt.

EXAMPLES

Example 1

256 g of poly-cis-butadiene with a 1,2-vinyl content of 11% of the double bonds and a 1,4-cis content of 38% of the double bonds ("Buna CB HX 502C", Bayer Elastomeres Frances) together with 0.26 g of 2,5-di-tert.-butyl phenol were dissolved at 40° C. under $N_2$ in 600 g toluene and 968 g styrene was added with agitation. The solution was transferred to a 5-litre surface-ground reactor with agitator extending to the wall and was heated to 60° C. Next, 376 g acrylonitrile and 4.70 g tert.dodecyl mercaptan were added and heated at normal pressure to 75° C.

Polymerization was started by adding 1.34 g tert.-butyl perpivalate in 70 g toluene. The polymerizing solution became cloudy and the viscosity increased. After 30 minutes the conversion rate was 11 wt. % (relative to styrene and acrylonitrile and determined by measuring the solids in a concentrated sample at 200° C.). Next, 810 g of a 30 wt. % solution of poly(styrene-co-acrylonitrile) (L-value: 60; ACN:styrene=28:72) in methyl ethyl ketone (2-butanone) together with 3.36 g tert.-dodecyl mercaptan was added with agitation within 30 minutes. Eleven minutes after beginning the addition, the viscosity of the reaction mixture decreased rapidly within 3 minutes. No visco-elastic states, which make it more difficult to agitate the polymerizing batch, were observed. The temperature was then increased to 80° C., after which a further 462 g of the 30 wt. % solution of poly(styrene-co-acrylonitrile) in methyl ethyl ketone (2-butanone) together with 1.68 g tert.-butyl peroctoate and 1.60 g Irganox 1076® (Ciba Geigy) was added with agitation in 4.5 hours and polymerization was continued for 4 hours at 87° C. The conversion rate was 65 wt. % (relative to styrene and acrylonitrile). The rubber content, determined by balancing the batch, was 16 wt. %.

The polymerizing solution was concentrated in a devolatilization extruder and granulated. In order to determine the notch impact strength, the granulate was then injection-moulded to form standard small rods under the following conditions:

| | |
|---|---|
| Temperature of material: | 230° C. |
| Temperature of mould: | 60° C. |
| Injection time: | 2.8 seconds. |

The brittleness of the standard small rods, with a V notch, was tested by rapid three-point bending (impact stress on a recording drop apparatus). The notch impact strength was as follows:

| | |
|---|---|
| $a_k$ RT: | 35.4 kJ/m² |
| Maximum force Fm: | 155 N |

Example 2

An ABS moulded material produced as in Example 1 and having a rubber content of about 20 wt. % was extruded and granulated in the proportion 1:0.44 with poly(styrene-co-acrylonitrile) (L-value: 60; ACN:styrene=28:72) on a conical two-shaft laboratory screw, rotating in opposite directions, from Messrs Haake, Karlsruhe, at 118 rpm. The resulting ABS moulding material had a rubber content of 14 wt. %.

The mechanical properties were tested with a view to application, with the following results:

TABLE 1

Mechanical properties of the ABS moulding material

| Example | $a_k$ 23° C. (kJ/m$^2$) | $a_k$ −40° C. (kJ/m$^2$) | Hc 30" 240° C. (N/mm$^2$) | MVR 10/220 (ml/10 min) | Vicat B 120 (° C.) | Gloss 240° C./70° C. 20° measured value (%) |
|---|---|---|---|---|---|---|
| 2 | 18 | 7 | 86 | 12.5 | 103 | 14 |

Examples 3 to 8

The polymerization batch described in Example 1 was prepared with variously concentrated solutions of poly(styrene-co-acrylonitrile) and with poly(styrene-co-acrylonitrile) of varying composition.

TABLE II

Composition of the poly(styrene-co-acrylonitrile) polymers, the polymer solutions and the ABS moulding compositions produced

| Example | Concentration of polymer solution (%) | Rubber content of end-product (%) | Polymer in end-product (%) | Styrene (%) | Acrylo-nitrile (%) | L-value |
|---|---|---|---|---|---|---|
| 3 | 10 | 14 | 6.0 | 72 | 28 | 60 |
| 4 | 20 | 18 | 17.8 | 72 | 28 | 60 |
| 5 | 40 | 14 | 35.6 | 72 | 28 | 60 |
| 6 | 20 | 14 | 13.6 | 76 | 24 | 80 |
| 7 | 20 | 14 | 13.6 | 72 | 28 | 100 |
| 8 | 20 | 14 | 13.6 | 66 | 34 | 80 |

TABLE III

Mechanical properties of the ABS moulding compositions

| Example | $a_k$ 23° C. (kJ/m$^2$) | $a_k$ −40° C. (kJ/m$^2$) | Hc 30" 240° C. (N/mm$^2$) | MVR 10/220 (ml/10 min) | Vicat B 120 (° C.) | Gloss 240° C./70° C. 20° measured value (%) |
|---|---|---|---|---|---|---|
| 3 | 25 | 7 | 91 | 15 | 105 | not determined |
| 4 | 37 | n.d. | n.d. | n.d. | n.d. | n.d. |
| 5 | 15 | 7 | 92 | 13 | 104 | n.d. |
| 6 | 29 | 9 | 92 | 12 | 106 | 20 |
| 7 | 28 | 8 | 92 | 11 | 107 | 12 |
| 8 | 26 | 9 | 92 | 13 | 107 | 21 |

Examples 9 to 17

The polymerization batch described in Example 1 was treated with a number of copolymers containing styrene and α-methyl styrene and the products were in some cases compounded with poly(styrene-co-acrylonitrile) as in Example 2.

TABLE IV

Composition of copolymers containing styrene and α-methyl styrene, and concentration of the metered polymer solutions

| Example | Polymer | Conc. of polymer soln. (%) | Styrene (%) | α-methyl styrene (%) | Acrylonitrile (%) | N-phenyl maleic imide (%) | Maleic acid anhydride (%) | L-value |
|---|---|---|---|---|---|---|---|---|
| 9 | Poly(α-methyl styrene-co-acrylonitrile) resin | 40 | — | 70 | 30 | — | — | 57 |
| 10 | Poly(α-methyl styrene-co-acrylonitrile) emulsion resin | 30 | — | 72 | 28 | — | — | 65 |
| 11 | Poly(styrene-co-acrylonitrile-co-N-phenyl maleic imide) | 20 | 56 | — | 21 | 23 | — | 67 |
| 12 | Poly(styrene-co-acrylonitrile-co-N-phenyl maleic imide) | 10 | 56 | — | 21 | 23 | — | 67 |
| 13 | Poly(styrene-co-acrylonitrile-co-N-phenyl maleic imide) | 20 | 56 | — | 21 | 23 | — | 67 |
| 14 | Poly(styrene-co-acrylonitrile-co-N-phenyl maleic imide) | 20 | 53 | — | 13 | 34 | — | 63 |
| 15 | Poly(styrene-co-maleic acid anhydride) | 20 | 83 | — | — | — | 17 | 60 |
| 16 | Poly(styrene-co-N-phenyl maleic imide) | 20 | 50 | — | — | 50 | — | — |
| 17 | Polystyrene | 20 | 100 | — | — | — | — | — |

TABLE V

Composition and mechanical properties of the ABS moulding compositions produced

| Example | Rubber content (%) | Polymer in end product (%) | $a_k$ 23° C. (kJ/m$^2$) | $a_k$ −40° C. (kJ/m$^2$) | Hc 30" 240° C. (N/mm$^2$) | MVR 10/220 (ml/10 min) | Vicat B 120 (° C.) | Gloss 240° C./ 70° C. 20° measured value (%) |
|---|---|---|---|---|---|---|---|---|
| 9 | 14 | 35.3 | 14 | 7 | 91 | 4 | 110 | not determined |
| 10 | 16 | 26.2 | 16 | 7 | 81 | 4 | 108 | n.d. |
| 11 | 16.5 | 16.4 | 33 | 22 | 77 | 2 | 108 | 5 |
| 12 | 14 | 6.0 | 28 | n.d. | n.d. | n.d. | n.d. | n.d. |
| 13 | 14 | 13.5 | 20 | 7 | 89 | 10 | 106 | n.d. |
| 14 | 17 | 17.1 | 21 | 10 | 72 | 3 | 110 | 5 |
| 15 | 18 | 17.3 | 34 | 21 | 75 | 3 | 108 | 6 |
| 16 | 17 | 17.1 | 27 | 14 | 74 | 1.5 | 114 | 4 |
| 17 | 18.5 | 18.0 | 21 | 10 | 68 | 3 | 101 | 33 |

TABLE VI

Composition of the copolymers containing (meth)acrylic acid esters and concentration of the metered polymer solutions

| Example | Polymer | Conc. of polymer soln (%) | Styrene (%) | α-methyl styrene (%) | Acrylonitrile (%) | Methyl methacrylate (%) | Butyl acrylate (%) | L-value |
|---|---|---|---|---|---|---|---|---|
| 16 | Poly(styrene-co-methyl methacrylate) | 20 | 50 | — | — | 50 | — | 68 |
| 17 | Poly(styrene-co-acrylo-nitrile-co-methyl methacrylate) | 20 | 50 | — | 25 | 25 | — | 99 |
| 18 | Poly(butyl acrylate-co-methyl methacrylate) | 20 | — | — | — | 90 | 10 | 64 |
| 19 | Poly(α-methylstyrene-co-acrylonitrile-co-methyl methacrylate) | 20 | — | 50 | 20 | 30 | — | 100 |
| 20 | Polymethyl methacrylate | 20 | — | — | — | 100 | — | *) |
| 21 | Polymethyl methacrylate | 30 | — | — | — | 100 | — | *) |
| 22 | Polymethyl methacrylate | 20 | — | — | — | 100 | — | *) |

*)The substance used was polymethyl methacrylate Plexiglas N7" by Messrs Röhm

TABLE VII

Composition and mechanical properties of the ABS moulding compositions produced

| Example | Rubber content (%) | Polymer in end product (%) | $a_k$ 23° C. (kJ/m$^2$) | $a_k$ −40° C. (kJ/m$^2$) | Hc 30" 240° C. (MPa) | MVR 10/220 (ml/10 min) | Vicat B 120 (° C.) | Gloss 240° C./70° C. 20° measured value (%) |
|---|---|---|---|---|---|---|---|---|
| 16 | 14 | 13.6 | 12 | n.d. | 88 | 9 | 102 | 13 |
| 17 | 14 | 13.6 | 19 | n.d. | 86 | 10 | 103 | 8 |
| 18 | 14 | 13.6 | 20 | n.d. | 88 | 7.5 | 102 | 10 |
| 19 | 14 | 13.6 | 13 | n.d. | 86 | 7.5 | 106 | 6 |
| 20 | 14 | 13.6 | 28 | 8 | 93 | 11 | 104 | n.d. |
| 21 | 15 | 25.4 | 28 | 9 | 80 | 7 | 102 | n.d. |
| 22 | 18 | 17.5 | 42 | 16 | 75 | 5 | 101 | 32 |

TABLE VIII

Composition and mechanical properties of the ABS moulding compositions produced

| Example | Rubber content (%) | Concentration of polymer solution (%) | Polymer in end product (%) | $a_k$ 23° C. (kJ/m$^2$) | $a_k$ −40° C. (kJ/m$^2$) | Hc 30" 240° C. (MPa) | MVR 10/220 (ml/10 min) | Vicat B 120 (° C.) | Gloss 240° C./70° C. 20° measured value (%) |
|---|---|---|---|---|---|---|---|---|---|
| 23 | 14 | 20 | 13.6 | 8 | n.d. | 90 | 7 | 108 | 9 |
| 24 | 18.5 | 20 | 17.5 | 11 | n.d. | 75 | 2 | 105 | n.d. |

We claim:

1. A method of producing ABS moulding compositions, wherein a solution of polymers in group (A) solvents is gradually supplied to a polymerizing mixture of aromatic mono-alkenyl compounds, ethylenically unsaturated nitriles, optional other copolymerizable vinyl compounds and optionally a group (B) solvent or a mixture of group (A) and group (B) solvents, the gradual addition of the polymer solution to the polymerizing mixture being started before the beginning of phase inversion and at a monomer conversion rate of 5 to 15% and a viscosity of the polymerizing mixture of less than 20 Pa.sec with simultaneous continuation of polymerization, the group (A) solvent is an aliphatic ($C_1$–$C_8$) or cycloaliphatic alcohol, ketone, ether, ester and/or nitrile, and the group (B) solvent is an aliphatic ($C_4$–$C_{10}$), cycloaliphatic and/or aromatic hydrocarbon.

2. A method according to claim 1, wherein the polymer is a copolymer comprising at least 50 wt. % of styrene and less than 50 wt. % of acrylonitrile, N-phenyl maleic imide, maleic acid anhydride or mixtures thereof.

3. A method according to claim 1, wherein the polymer is a copolymer comprising at least 50 wt. % of α-methyl styrene and less than 50 wt. % of acrylonitrile, maleic acid anhydride, N-phenyl maleic imide or mixtures thereof.

4. A method according to claim 1, wherein the polymer is a copolymer comprising at least 20 wt. % of methyl methacrylate and less than 80 wt. % of styrene, α-methyl styrene, acrylonitrile, butyl acrylate or N-phenyl maleic imide.

5. A method according to claim 1, wherein the polymer is poly(styrene-co-acrylonitrile).

6. A method according to claim 1, wherein the polymer is poly(styrene-co-acrylonitrile-co-N-phenyl maleic imide).

7. A method according to claim 1, wherein the polymer is polymethyl methacrylate.

8. A method according to claim 1, characterised in that, wherein the polymer is a co- or homo-polycarbonate containing at least 10 wt. % of bisphenol 1,1-bis(4-hydroxyphenyl)-3,3,5-trimethyl cyclohexane.

* * * * *

UNITED STATES PATENT AND TRADEMARK OFFICE
CERTIFICATE OF CORRECTION

PATENT NO. : 5,981,644
DATED : November 9, 1999
INVENTOR(S) : Ralph Ostarek, et. al.

It is certified that error appears in the above-identified patent and that said Letters Patent is hereby corrected as shown below:

Column 9, after Table V, the following should be inserted:

-- Examples 18 to 22

The polymerization bach described in Example I was treated with a number of copolymers containing (meth)acrylic acid esters and the products in some cases were compounded with poly(styrene-co-acrylonitrile) as in Example 2. --

Column 11, after Table VII, the following should be inserted:

-- Examples 23 and 24:

The polymerization batch described in Example 1 was treated with a co-polycarbonate consisting of 35 mol. % of bisphenol 1,1-bis(4-hydroxyphenyl-3,3,5-trimethyl cyclohexane and 65 mol.% of bisphenol bis(4-hydroxyphenyl)-dimethyl propane according to Example 2 and compounded with poly(styrene co-acrylonitrile). --

Signed and Sealed this

Thirtieth Day of May, 2000

Attest:

Q. TODD DICKINSON

*Attesting Officer*     *Director of Patents and Trademarks*